3,478,108
ISOBUTANE OXIDATION
Henry R. Grane, Springfield, Pa., assignor to Atlantic Richfield Company, Philadelphia, Pa., a corporation of Pennsylvania
No Drawing. Filed Feb. 21, 1966, Ser. No. 528,832
Int. Cl. C07c 73/06, 31/12, 27/12
U.S. Cl. 260—610          3 Claims

ABSTRACT OF THE DISCLOSURE

An improved method of obtaining tert-butyl hydroperoxide and tert-butyl alcohol through mixed phase oxidation of isobutane with water added to the reaction mixture whereby conversion and selectivity may be controlled with consistently higher yields of the desired products.

---

This invention relates to isobutane oxidation. In another aspect, this invention relates to the production of tertiary butyl hydroperoxide and tertiary butyl alcohol by oxidation of isobutane. In a further aspect, this invention relates to a method of controlling the conversion and selectivity in this reaction.

In recent years, tertiary butyl hydroperoxide has become of considerable value in the chemical industry. It serves as a starting material for the production of ditertiary butyl peroxide. It can be used as a source of oxygen for the oxidation of olefins resulting in the formation of the corresponding epoxide.

In view of the increased importance of tertiary butyl hydroperoxide there has been recent activity in the search for improved methods of preparing it. One of the methods used is the direct oxidation of isobutane with an oxygen containing gas such as air. The present invention relates to an improvement in this process.

The following are objects of my invention.

An object of my invention is to provide an improved process for the production of tertiary butyl hydroperoxide by the direct oxidation of isobutane. A further object of my invention is to provide a new method for the control of this reaction by which it is possible to adjust the total conversion of the product distribution.

Other objects of my invention will be apparent to those skilled in the art upon reading this disclosure.

Broadly, my invention is directed to the liquid phase oxidation of isobutane with molecular oxygen to produce a reaction mixture containing tertiary butyl hydroperoxide and tertiary butyl alcohol in which the improvement comprises adding water to the reaction mxiture. As is known, some water is present as a by-product of the reaction but my invention requires the addition of water beyond that present as a result of the oxidation process.

The amount of water added varies within comparatively narrow limits. Since about 1 percent water, on a weight basis, is present as a by-product of the reaction, I generally add sufficient water to provide at least 2 percent water based upon the weight of the reaction mixture. Generally, not more than 3 percent water is desired in the reaction mixture although it can be added up to the point at which it is immiscible in the reaction mixture under the reaction conditions. This upper limit is approximately 6 percent water by weight.

The oxidation reaction is quite well known in the art and need not be extensively described. Briefly, the reaction is generally carried out in liquid phase at a temperature of 200–300° F. with pressures of 300–700 p.s.i.g. To prevent undesirable side reactions, it is generally desirable to exclude metal ions although this is not a part of the present invention and metal ions can be present if desired.

While the invention is not limited to pure isobutane, best results are obtained when the hydrocarbon feed stream contains 90 percent of higher isobutane by weight. Other hydrocarbons, such as benzene and the normal paraffins can be present as a diluent, but their use is optional.

Air is a very suitable source of oxygen for the reaction although other sources of molecular oxygen can be used. Specifically, it is possible to use essentially pure oxygen or oxygen mixed with other inert diluents.

Reactors are used which permit bubbling the oxygen containing gas through the liquid isobutane. A slight excess of the oxygen is frequently used and the concentration in the reaction zone can be within the range of 0.1 to 10 percent and preferably from 0.3 to 7 percent.

As is apparent from the work reported hereinafter, the reaction can be carried out as a batch process or by continuous operation. Following the reaction, conventional separation steps are practiced to recover each of the products and unreacted isobutanes can be recycled to the reaction zone. In the batch process and in the start-up of the continuous process, the induction period for the reaction can be reduced by adding a small quantity of hydroperoxide from the previous run.

The following examples are given as specific embodiments to illustrate my invention. The exact details set forth therein should not be considered unduly limiting.

Example 1

In this example, batch operation is illustrated. A stainless steel reaction vessel of 100 cc. capacity was used in each of the runs. The reaction vessel had previously been cleaned by contacting it with 20 percent nitric acid for 2 hours at 200–212° F. followed by soaking with deionized water and a 2 percent sodium pyrophosphate solution. Into this reaction vessel, there was charged 100 cc. of isobutane containing 5 percent by weight of tertiary butyl hydroperoxide as a promoter. Air was used as the oxygen source and the pressure maintained at 600 p.s.i.g. Following oxidation, the product was analyzed for tertiary butyl hydroperoxide (TBHP) and tertiary butyl alcohol (tBuOH). This run was repeated under substantially the same conditions with the addition of 5.4 percent water based on the isobutane. The results obtained with both of these runs are set forth in the following table. Only details are set forth which varied between the two runs.

| Run | Temp., °F. | Time, hrs. | Conversion, wt. percent | Selectivity, percent [1] | |
|---|---|---|---|---|---|
| | | | | TBHP | tBuOH |
| 1 | 255 | 15 | 22 | 68 | 26 |
| 2 | 256 | 11 | 28 | 54 | 38 |

[1] Water free basis.

This run illustrates the increased conversion obtained by the water addition as well as the effect on selectivity. The conversion was higher even though the reaction was run for a shorter time.

Example 2

The invention was also practiced using a continuous process as set forth in this example. The reactor in this case was a 300 cc. stainless steel reactor equipped with a stirrer and appropriate inlet and outlet conduits for continuous operation. The initial charge to the reactor was 180 cc. of isobutane and no water. Details of the reaction are shown in the following table. Air was the source of oxygen. In this table, the first part of the run was carried out without water addition and then water addition to the reaction zone was initiated. This was done by adding water to the isobutane stream at a level of 6 percent based upon the isobutane. In view of the residence time in the reactor, there was a gradual build-up in the water level therein. The effect of this build-up is apparent in the table. Run 3 shows the conditions for an eight hour period after initial operation for approximately 16 hours to establish steady state operation. The additional run designations, 3A, 3B, and 3C give the conditions, etc. for the period shown.

| Run | Time, hrs. | Temp., °F. | Pressure p.s.i.q. | Liquid isobutane feed, cc./hr. at reactor temp. | Average water content in reactor, wt. percent | Air feed rate, std. liters/hr. | Isobutane conversion | | TBPH in product, wt. percent |
|---|---|---|---|---|---|---|---|---|---|
| | | | | | | | Percent | Percent/hr. | |
| 3 | 8.0 | 273 | 450 | 22 | 1 | 11 | 48.3 | 6.0 | 44 |
| 3A | 6.6 | 273 | 450 | 27 | 3 | 11 | 55 | 8.3 | 48 |
| 3B | 6.9 | 266 | 400 | 26 | 4 | 11 | 55 | 8.0 | 30 |
| 3C | 6.2 | 273 | 800 | 29 | 6 | 12 | 52 | 8.4 | 38 |

Once again, the effect of water addition is readily apparent. The percentage conversion of the isobutane increases from a level of 6.0 percent per hour to 8.0 percent and higher per hour. The tertiary butyl hydroperoxide drops off but only very slightly at the lower water levels. Thus, it can be seen that, at a water level of 2 to 3 percent, the actual hydroperoxide production can be increased because of the increased conversion.

Obviously, those skilled in the art will recognize that modifications and variations of the invention can be made and these should be considered as coming within the scope of the invention.

I claim:

1. In the liquid phase process for the oxidation of isobutane with molecular oxygen to produce a reaction mixture containing tert-butyl alcohol and tert-butyl hydroperoxide, said process operating at temperatures of about 200° to 300° F. and a pressure of about 300 to 700 p.s.i.g., the improvement comprising: adding water to said reaction mixture to an amount of between about 2 to 6 percent water by weight of said reaction mixture, said amount being such as to maintain said water miscible in said reaction mixture at the operating temperature and pressure.

2. The process of claim 1 wherein the water is charged in an amount to provide 2 to 3 weight percent based on the reaction mixture.

3. The process of claim 1 wherein air is the source of molecular oxygen.

References Cited

UNITED STATES PATENTS 2,663,740 12/1953 Calhoun et al. _____ 260—610
2,845,461 7/1958 Winkler et al.
3,092,667 6/1963 Murphy.

OTHER REFERENCES

Abstract of Published, Application 121,229, "Hydrocarbon Oxidation," Charles Perry, published Nov. 20, 1951.

BERNARD HELFIN, Primary Examiner

W. B. LONE, Assistant Examiner

U.S. Cl. X.R.

260—632